US006792517B1

(12) United States Patent
Brunnett et al.

(10) Patent No.: US 6,792,517 B1
(45) Date of Patent: Sep. 14, 2004

(54) FIRMWARE CONTROLLED BACKUP IN DISK DRIVES

(75) Inventors: Don Brunnett, Pleasanton, CA (US); Erhard Schreck, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 182 days.

(21) Appl. No.: 10/173,560

(22) Filed: Jun. 18, 2002

Related U.S. Application Data

(60) Provisional application No. 60/299,143, filed on Jun. 18, 2001.

(51) Int. Cl.[7] .............................................. G06F 12/00
(52) U.S. Cl. ......................... 711/162; 710/68; 707/204; 714/6
(58) Field of Search ................... 74/161–162; 707/204; 714/6; 713/202; 710/68; 711/170, 165

(56) References Cited

U.S. PATENT DOCUMENTS

| 4,959,860 | A | * | 9/1990 | Watters et al. .............. 713/202 |
| 5,920,733 | A | * | 7/1999 | Rao .............................. 710/68 |
| 6,175,904 | B1 | * | 1/2001 | Gunderson ..................... 711/62 |
| 6,205,529 | B1 | * | 3/2001 | Shagam ....................... 711/170 |
| 6,393,540 | B1 | * | 5/2002 | Blumenau et al. ........... 711/165 |
| 2002/0104038 | A1 | * | 8/2002 | Harmer .......................... 714/6 |

OTHER PUBLICATIONS

Microsoft Corporation, Microsoft Computer Dictionary, 2002, Microsoft Press, Fifth Edition, p. 246.*

* cited by examiner

*Primary Examiner*—Mano Padmanabhan
*Assistant Examiner*—Thang Ho
(74) *Attorney, Agent, or Firm*—David M. Sigmond

(57) ABSTRACT

A personal computer hard disk has disk media that comprises a primary portion and a backup portion; both portions are in the same hard disk housing. The backup portion is logically separate from the primary portion, and access to the logically separate backup portion is controlled by a backup access control mechanism. The backup access control mechanism may comprise a manually-actuable mechanism, such as a switch or a jumper, or it may comprise software provided in an ROM forming part of the internal memory of the hard disk.

100 Claims, 2 Drawing Sheets

FIRMWARE CONTROLLED BACKUP IN DISK DRIVES

PRIORITY APPLICATION DATA

Priority is claimed to U.S. Provisional Application No. 60/299,143, filed Jun. 18, 2001, the content of which is hereby expressly incorporated by reference herein in its entirety.

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

BACKGROUND OF THE INVENTION

1. Field of the Invention

The present invention, in certain respects, relates to consumer PC hard disks. In other respects, the present invention relates to tools for backing up data of a hard disk and for preventing data loss and data corruption.

2. Description of Background Information

Single user computer systems, i.e., personal computers, perform backups typically using tape drives or CD ROM backup peripherals. Some personal computer operating systems may support mirroring of data on a second/supplemental hard disk. There are limitations with these methods of backing up data, particularly with the use of tape backup and CD ROM backup procedures. Both of these methods require a user to be actively involved in the backup process. The user must remember to perform backups, to monitor the backup process, and to address backup problems when they occur. For example, the user may need to, for a given backup operation, replace the tape or CD ROM due to a limit in the storage space of the backup in storage device. In addition, the speed with which data can be written to and read from such storage devices is a substantial limitation.

Writable DVDs can be used to backup data, and have an increased storage capacity (for example, on the order of 15 GB). However, the speed with which data can be written to a writable DVD is substantially limited.

SUMMARY OF THE INVENTION

There is a need for tools that make it easier for users of personal computers to backup their data and to retrieve data from backup. There is a further need for mechanisms that speed up the rate with which data can be retrieved from backup.

The present invention is provided to achieve one or more of the objects and advantages as set forth herein. The aspects of the invention presented herein improve upon computer hard disks and improve the methods and systems for backing up hard disks. A more specific object of the present invention may be to prevent data loss, for example, due to unintentional erasure or due to intentional tampering of a hard disk, (e.g., a virus).

The invention may allow for immediate access to backed up data in a fast-access, non-volatile storage (e.g., within the same hard disk). Another object of the invention may be to provide an entire imaged backup of the hard disk in a backup area provided within the same hard disk. A further object of the present invention may be to provide firmware control of the backup space within the hard disk. Another object can be to provide a mechanism resistant to external tampering (e.g., hardward or firmware) that precludes unauthorized access to data in the disk—specifically data in the backup area of the disk.

One aspect of the invention is directed to a personal computer hard disk that contains a backup portion as well as a primary portion. The invention may be directed to any one or more subparts of such a personal computer hard disk or to a method including acts performed by such a personal computer hard disk. The invention may be further directed to subparts of the method and specific sets of acts thereof.

In accordance with one embodiment, the hard disk comprises a unitary hard disk housing, an input/output interface in the housing, a control portion, internal memory, a head/disk assembly, hardware interaction circuitry (coupling the control portion to the head/disk assembly), backup control software, and a backup access control mechanism. The input/output interface connects the hard disk to a host computer. The control portion controls storage-related operations of the hard disk. The internal memory includes disk operational software and operational data. The head/disk assembly comprises a spindle motor, a servo, read write heads, and disk media.

The backup control software is provided in the internal memory, and controls the backing up of data in a primary storage portion of the disk media to a logically separate backup portion of the disk media. The backup access control mechanism controls access to the logically separate backup portion of the disk media.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

Figure 1:
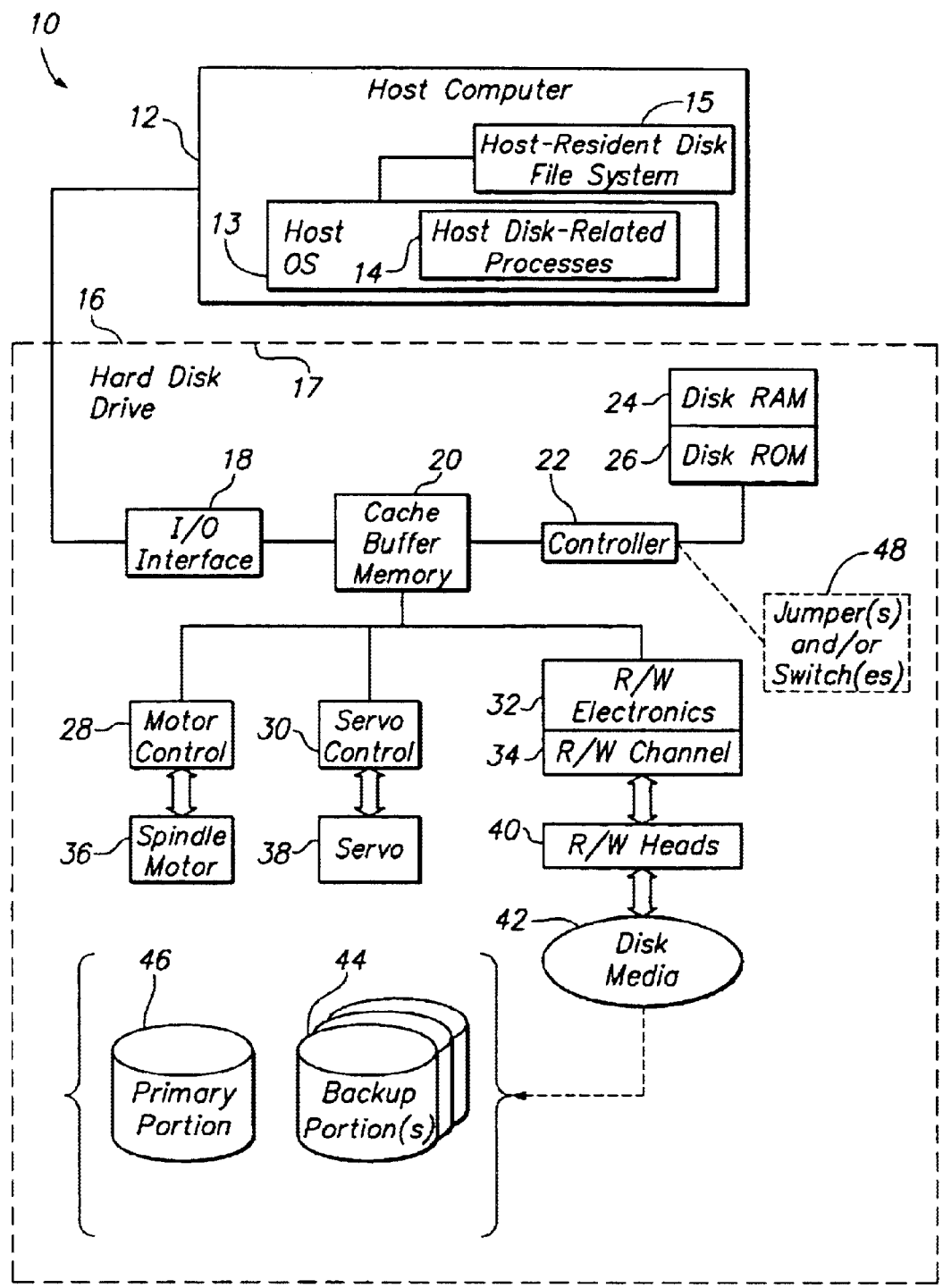
FIG. 1 is a block diagram of one embodiment of a computer system provided with a hard disk having one or more protected backup portions.

Referring now to the drawings in greater detail, FIG. 1 is a block diagram of one embodiment of a personal computer system 10. The computer system 10 has a hard disk 17 provided with an integral, protected backup portion. The illustrated hard disk 10 comprises, among other elements, disk media 42. In the illustrated embodiment, disk media 42 comprises magnetic media sputtered onto a metal substrate (the metal may be aluminum). Disk media 42 is logically split into a primary portion 46 and selective (controlled) access backup portion or portions 44.

The illustrated computer system 10 comprises a host system 12 and a hard disk 10. Hard disk 10 comprises a unitary hard disk housing 17 which houses an input/output interface 18, a cache buffer memory 20, a controller 22, a RAM (random access memory) 24, and a ROM (read only memory) 26. Input/output interface 18 is connected to cache buffer memory 20, which is connected to controller 22. Each of the RAM and ROM portions 24, 26 is coupled to controller 22.

Hard disk housing 17 further houses a motor control 28, a servo control 30, read/write electronics 32, and a read channel 34. Motor control 28 is connected to a spindle motor 36 which is also provided in hard disk housing 17. Servo control 30 is connected to a servo 38, which is also provided in the hard disk housing 17. Read channel 34 is coupled to read/write heads 40, which interact with disk media 42. Read/write heads 40 and disk media 42 are also provided within the unitary hard disk housing 17.

Input/output interface 18 may comprise a SCSI, IDE, or ADA interface, just to name a few examples. While a cache buffer memory 20 is not required, it is common to provide the same.

One or more jumpers and/or switches 48 may also be provided, connected (directly or indirectly) to controller 22. Jumpers or switches may be provided on hard disks to allow an operator adjust or select among various settings of the controller of the hard disk. In the illustrated embodiment, jumpers and/or switches 48 may comprise one or more specific jumpers or switches for controlling the backup processes by which data on primary portion 46 of disk media 42 is backed up onto backup portions 44 of disk media 42. In the embodiment, controller 22 serves as a control portion of the hard disk. Motor control 28, servo control 30, read/write electronics 32, and read channel 34 collectively comprise hardware interaction circuitry coupling controller 22 to a head/disk assembly, which comprises spindle motor 36, servo 38, read/write heads 40, and disk media 42.

In the illustrated embodiment, hard disk 10 has, in its housing 17, internal memory, including RAM 24 and ROM 26. All or a portion of such memory (and any other devices or mechanisms that may be provided in the hard disk and that serve as memory) may serve as the internal memory for the hard disk, and may contain information pertinent to the functions and operation of the hard disk.

Figure 2:
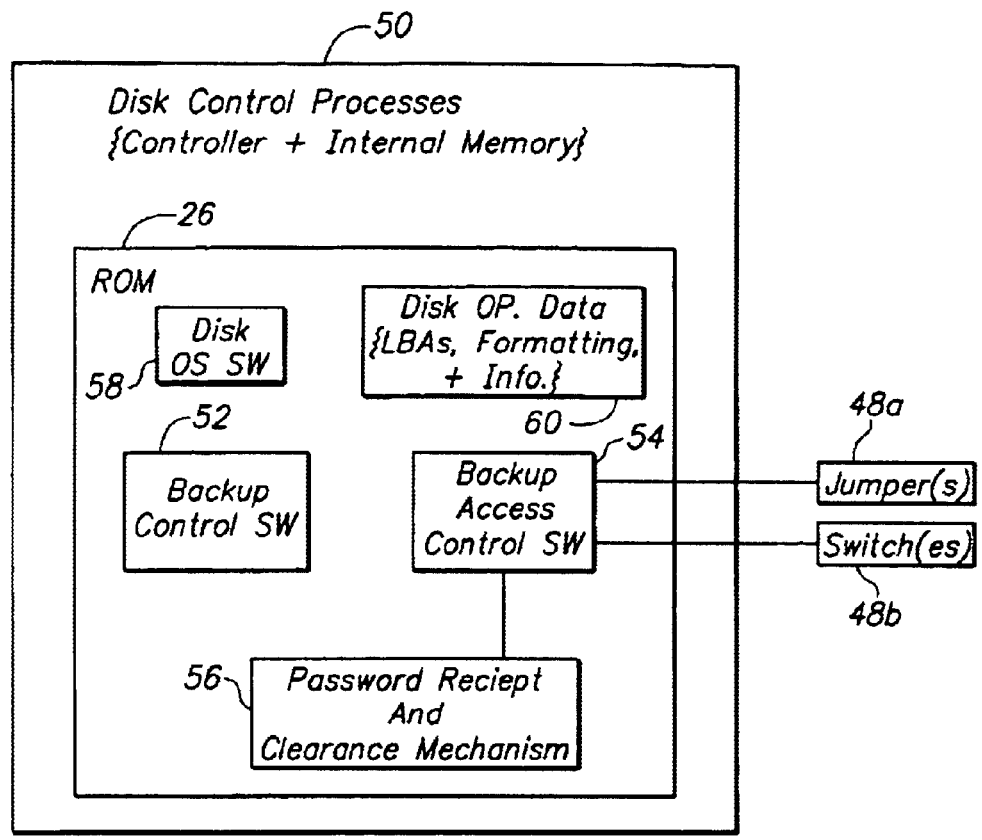
FIG. 2 is a block diagram of an embodiment of a disk control process of the hard disk.

FIG. 2 is a block diagram of the control processes 50 of the disk which, in the illustrated embodiment, are embodied in the controller and in the disk's internal memory (comprising RAM 24 and ROM 26 in the illustrated embodiment).

In the illustrated block diagram, shown in FIG. 2, disk control processes 50 comprise ROM 26. A number of processing components are stored within ROM 26, some of which are illustrated in FIG. 2. Other processing components may be provided that are not specifically shown in FIG. 2. As shown in FIG. 2, within ROM 26, backup control software 52 and backup access control software 54 are each provided. In addition, ROM 26 has disk operating system software 58 and disk operational data 60. ROM 26 further comprises a password receipt and clearance mechanism 56.

Hardware switching mechanisms may be connected to backup access control software 54. In the illustrated embodiment, one or more jumpers 48a and switches 48b are coupled to backup access control software 54.

Disk operating system software 58 handles various operational aspects of the disk, and disk operational data 60 contains data required for the operation of the disk. In the illustrated embodiment, disk operational data 60 comprises, among other types of information, logical block address (LBA) and formatting table information for handling intermediate and lower level disk formatting.

Figure 3:
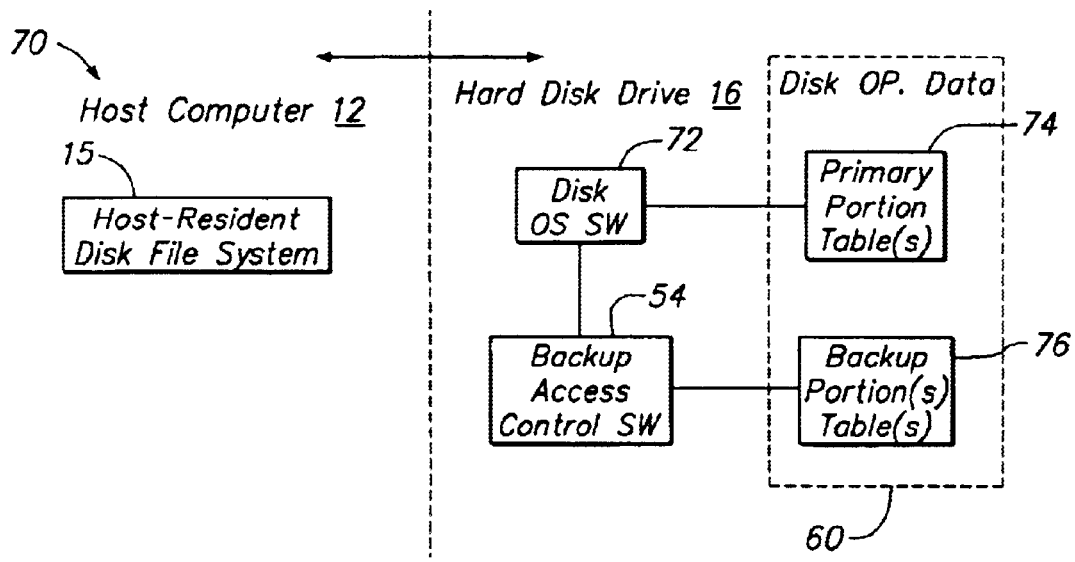
FIG. 3 is a block diagram of a hard disk file system.

FIG. 3 is a block diagram of a hard disk file system 70 of the illustrated computer system 10 shown in FIG. 1. The illustrated hard disk file system 70 comprises a host resident disk file system 16 stored within memory of host system 12 and disk-resident portions of the file system, including disk operating system software 72, backup access control software 54 and disk operational data 60. In the illustrated embodiment, disk operational data 60 comprises primary portion table(s) 74 and backup portion(s) table(s) 76. In this embodiment a portion of disk operating system software 72 comprises disk operating system software 58 (within ROM 26) as shown in FIG. 2; the rest of disk operating system software 72 may be within RAM 24.

Primary portion table(s) 74 comprise disk operational data for accessing (read and write) the portion of the disk media that corresponds to primary portion 46. Primary portion table(s) 74 do not provide access information that will allow access to the backup portions 44. Such disk operational data may comprise logical block address and formatting table information that can be addressed by the host-resident disk file system 16 via disk operating system software 72 for purposes of reading or writing data from and to the primary portion of the disk media.

Backup portion table(s) 76 comprise disk operational data allowing reading from and writing to the backup portions 44 of disk media 42.

In order for any process, within or outside of the hard disk, to access the data on the backup portions of the media, it must gain access from backup access control software 54, provided within the ROM. Accordingly, data loss or corruption can be prevented due to, for example, the unintentional erasure of data or due to intentional tampering (e.g., virus intrusion). In addition, host computer 12 can immediately access the data in the backup portion. Delays associated with acquiring data from a tape backup or a CD-ROM storage are now not necessary, as the backed up data is in the same hard disk. In the illustrated embodiment, the entire image of the primary disk portion is saved in the backup portion.

Control software that controls the backup space is provided in the ROM, which makes it more difficult for someone to gain unauthorized access to the backed up data.

Backed up data can be accessed in one of two ways, in the illustrated embodiment. The data can be accessed directly by the host, without moving the data from the backup portion of the disk media. Alternately, the data can be restored from the backup portion of the hard disk to the primary portion of the hard disk before access is provided to the host. The host computer operating system software or its BIOS can be provided with a mechanism that is automatically triggered when the computer has difficulty rebooting while installing new software. If this occurs, the operating system software and other software of the host computer can be obtained and referred to through the backup portion of the hard disk. This can be facilitated by simply providing an access key to the host operating system. Once the host operating system has that access key, it can have complete access to the data stored in the backup portion and treat that portion as if it was the primary portion. A process may also be provided for recovering data within a specified date range, i.e. that was either created, modified, or backed up within a certain specified range of dates. Other criteria may be provided for accessing backed up data and may be provided within the backup portion of the host-resident disk operations software.

The disk may be provided with two alternate modes: in a first mode, the host, whenever it accesses data (reading or writing) in the hard disk, uses the primary portions of the disk media, and in a second mode, the host uses the backup portion of the disk media. When a given block is specified by the host for retrieval or for writing, if the hard disk is set to be in the first mode, that block of information is read from or written to a location within the primary portion. If the hard disk is in the second mode, that given block will be read from or written to a location within the backup portion.

Alternatively, the backup area could always be accessible by the host, but in a read-only capacity. In any of these cases, virus damage and unintentional erasure or damaging of the backup information will be prevented.

The high level formatting table provided to the host system will have an available LBA (logical block address) capacity which is reduced relative to the full capacity of the hard disk, as the hard disk is divided into a primary portion and one or more backup portions. Accordingly, instead of providing to the host a full LBA capacity, the firmware, i.e., ROM 26 of hard disk 11, subdivides the user available LBAs into full LBA capacity/(N+1), where N is the number of disk images that are being maintained in backup portions 44. The embodiment contemplates that the number of backup portions may be between one and two (more are possible), depending upon the available disk drive capacity and the desired security level. One copy could be for daily backups, while the second could be for weekly backups.

By way of example, consider the backup of one disk image in a backup portion 44, which is performed once a day. At the time of the daily schedule backup, the entire drive content, including operating system data, is mirrored to the firmware controlled backup portion. All data in the hard disk is now stored at the same LBA number plus an offset as in the original storage area in the primary portion 46. Accordingly, if data is retrieved from the backup portion, because the original data area was damaged, the firmware can either copy this disk image data back to the same LBA number plus offset location in the primary portion, or the firmware can use the same LBA offset for referring to the data in the backup portion for access to the user in using the host. The old original area can now be used for the firmware controlled disk mirroring.

Various advantages may be realized by the features disclosed herein. The retrieval of data can be instantaneous, since the same hard disk is used for storing the backup data. The backup area cannot be accessed by a computer virus, because switching access to the backup portion requires the use of a jumper, a switch, or a specific password. Performing a backup or recovery is extremely fast, allowing complete rather than incremental backups of several gigabytes in less than one hour. The control of the backup portion by the disk operating system can be independent of the operating system of the host. If new software is installed to the computer, the risk is non-existent that the system will be rendered unusable, as a complete mirror image of the primary disk will be maintained in the backup portion.

While the invention has been described with reference to certain illustrated embodiments, the words which have been used herein are words of description, rather than words of limitation. Changes may be made, within the purview of the appended claims, without departing from the scope and spirit of the invention in its aspects. Although the invention has been described with reference to particular structures, acts, and materials, the invention is not to be limited to the particulars disclosed, but rather extends to all equivalent structures, acts, and materials, such as are within the scope of the appended claims.

What is claimed is:

1. A single hard disk drive with a separately accessible backup portion, said hard disk drive comprising:
   a unitary housing;
   an input/output interface in said housing for connection to a host computer;
   a control portion in said housing;
   internal memory in said housing comprising disk operation software and disk operation data;
   a head/disk assembly comprising, entirely in said housing, a spindle motor, a servo, a read/write head and a disk media;
   hardware interaction circuitry in said housing coupling said control portion to said head/disk assembly;
   disk-resident backup control software in said internal memory;
   a disk-resident backup access control mechanism in said housing; and
   said disk media comprising a primary portion accessible to the host computer connected to said input/output interface and a logically separate backup portion, access to which is controlled by said backup access control mechanism and by said disk-resident backup control software, such that the primary portion is backed up to the backup portion without transferring the primary portion outside the housing.

2. The hard disk drive according to claim 1, wherein said input/output interface comprises at least one of a SCSI interface and an ATA interface.

3. The hard disk drive according to claim 1, wherein said control portion comprises at least one of a microprocessor and a microcontroller.

4. The hard disk drive according to claim 3, wherein said disk operational software comprises disk operating system software and wherein said disk operational data comprises logical block address and formatting table information.

5. The hard disk drive according to claim 4, wherein said disk media comprises magnetic media sputtered onto an aluminum substrate.

6. The hard disk drive according to claim 5, wherein said read/write head comprises a magneto resistive (MR) head.

7. The hard disk drive according to claim 1, wherein said backup access control mechanism comprises a manually-actuatable mechanism.

8. The hard disk drive according to claim 7, wherein said manually-actuatable mechanism comprises a switch.

9. The hard disk drive according to claim 7, wherein said manually-actuatable mechanism comprises a jumper.

10. The hard disk drive according to claim 1, wherein said backup access control mechanism comprises software.

11. The hard disk drive according to claim 10, wherein said backup access control mechanism comprises access software in a ROM forming part of said internal memory, the access software being actuatable in response to a password provided by a disk-related process of the host computer to which said hard disk drive may be connected via said input/output interface.

12. The hard disk drive according to claim 1, wherein said backup access control mechanism comprises a write access limiting mechanism for limiting write access, so that the host computer will only have read access to the backup portion.

13. The hard disk drive according to claim 1, wherein said backup portion comprises plural backup portions.

14. The hard disk drive according to claim 1, wherein the primary portion is backed up to the backup portion using the read/write head.

15. The hard disk drive according to claim 14, wherein the primary portion is backed up to the backup portion using the spindle motor and the servo.

16. The hard disk drive according to claim 15, wherein the primary portion is backed up to the backup portion using the disk operation software and the disk operation data.

17. The hard disk drive according to claim 16, wherein the primary portion is backed up to the backup portion without using the input/output interface.

18. The hard disk drive according to claim 17, wherein the primary portion is backed up to the backup portion without using the host computer.

19. The hard disk drive according to claim 1, wherein the primary portion is backed up to the backup portion without using the input/output interface.

20. The hard disk drive according to claim 1, wherein the primary portion is backed up to the backup portion without using the host computer.

21. A single hard disk drive adapted to interface with a host computer, the hard disk drive comprising:
   a disk media that includes a primary portion and a logically separate backup portion; and
   a controller that allows the host computer to read from and write to the primary portion, does not allow the host computer to write to the backup portion, and backs up the primary portion to the backup portion without transferring the primary portion outside the hard disk drive.

22. The hard disk drive according to claim 21, wherein the controller allows the host computer to read from the backup portion.

23. The hard disk drive according to claim 21, wherein the controller does not allow the host computer to read from the backup portion.

24. The hard disk drive according to claim 21, wherein the controller transfers the backup portion to the primary portion in response to a password sent from the host computer to the hard disk drive.

25. The hard disk drive according to claim 21, wherein the controller transfers the backup portion to the primary portion in response to a manually-actuatable mechanism that is part of the hard disk drive.

26. The hard disk drive according to claim 25, wherein the manually-actuatable mechanism is a switch.

27. The hard disk drive according to claim 25, wherein the manually-actuatable mechanism is a jumper.

28. The hard disk drive according to claim 21, wherein the controller backs up the primary portion to the backup portion under a user-defined criteria.

29. The hard disk drive according to claim 21, wherein the controller backs up the primary portion to the backup portion by adding an offset to logical block addresses in the primary portion.

30. The hard disk drive according to claim 21, wherein the controller backs up the primary portion to the backup portion to provide a complete mirror of an entire content of the hard disk drive.

31. A single hard disk drive adapted to interface with a host computer, the hard disk drive comprising:
   a disk media that includes a primary portion and a logically separate backup portion; and
   a controller that allows the host computer to read from and write to the primary portion, does not allow the host computer to write to the backup portion, backs up the primary portion to the backup portion automatically without transferring the primary portion outside the hard disk drive, and transfers the backup portion to the primary portion in response to user intervention without transferring the backup portion outside the hard disk drive.

32. The hard disk drive according to claim 31, wherein the controller allows the host computer to read from the backup portion.

33. The hard disk drive according to claim 31, wherein the controller does not allow the host computer to read from the backup portion.

34. The hard disk drive according to claim 31, wherein the controller transfers the backup portion to the primary portion in response to a password sent from the host computer to the hard disk drive.

35. The hard disk drive according to claim 31, wherein the controller transfers the backup portion to the primary portion in response to a manually-actuatable mechanism that is part of the hard disk drive.

36. The hard disk drive according to claim 35, wherein the manually-actuatable mechanism is a switch.

37. The hard disk drive according to claim 35, wherein the manually-actuatable mechanism is a jumper.

38. The hard disk drive according to claim 31, wherein the controller backs up the primary portion to the backup portion under a user-defined criteria.

39. The hard disk drive according to claim 31, wherein the controller backs up the primary portion to the backup portion by adding an offset to logical block addresses in the primary portion.

40. The hard disk drive according to claim 31, wherein the controller backs up the primary portion to the backup portion to provide a complete mirror of an entire content of the hard disk drive.

41. A single hard disk drive adapted to interface with a host computer, the hard disk drive comprising:
   a disk media that includes a primary portion and a logically separate backup portion; and
   a controller that (1) allows the host computer to read from and write to the primary portion, does not allow the host computer to write to the backup portion, and automatically backs up the primary portion to the backup portion without transferring data from the hard disk drive to an external device outside the housing, and (2) transfers the backup portion to the primary portion only in response to user intervention and without transferring data from the hard disk drive to an external device outside the hard disk drive.

42. The hard disk drive according to claim 41, wherein the controller allows the host computer to read from the backup portion.

43. The hard disk drive according to claim 41, wherein the controller does not allow the host computer to read from the backup portion.

44. The hard disk drive according to claim 41, wherein the controller transfers the backup portion to the primary portion in response to a password sent from the host computer to the hard disk drive.

45. The hard disk drive according to claim 41, wherein the controller transfers the backup portion to the primary portion in response to a manually-actuatable mechanism that is part of the hard disk drive.

46. The hard disk drive according to claim 45, wherein the manually-actuatable mechanism is a switch.

47. The hard disk drive according to claim 45, wherein the manually-actuatable mechanism is a jumper.

48. The hard disk drive according to claim 41, wherein the controller backs up the primary portion to the backup portion under a user-defined criteria.

49. The hard disk drive according to claim 41, wherein the controller backs up the primary portion to the backup portion by adding an offset to logical block addresses in the primary portion.

50. The hard disk drive according to claim 41, wherein the controller backs up the primary portion to the backup portion to provide a complete mirror of an entire content of the hard disk drive.

51. A single hard disk drive adapted to interface with a host computer, the hard disk drive comprising:
   a disk media that includes a primary portion and a logically separate backup portion; and
   a controller that (1) allows the host computer to read from and write to the primary portion, does not allow the host computer to write to the backup portion, and backs up the primary portion to the backup portion without transferring the primary portion outside the hard disk drive during a first user-defined mode, and (2) allows the host computer to read from and write to the backup portion during a second user-defined mode.

52. The hard disk drive according to claim 51, wherein the controller allows the host computer to read from the backup portion during the first user-defined mode.

53. The hard disk drive according to claim 51, wherein the controller does not allow the host computer to read from the backup portion during the first user-defined mode.

54. The hard disk drive according to claim 51, wherein the controller enters the first and second user-defined modes in response to a password sent from the host computer to the hard disk drive.

55. The hard disk drive according to claim 51, wherein the controller enters the first and second user-defined modes in response to a manually-actuatable mechanism that is part of the hard disk drive.

56. The hard disk drive according to claim 55, wherein the manually-actuatable mechanism is a switch.

57. The hard disk drive according to claim 55, wherein the manually-actuatable mechanism is a jumper.

58. The hard disk drive according to claim 51, wherein the controller backs up the primary portion to the backup portion under a user-defined criteria.

59. The hard disk drive according to claim 51, wherein the controller backs up the primary portion to the backup portion by adding an offset to logical block addresses in the primary portion.

60. The hard disk drive according to claim 51, wherein the controller backs up the primary portion to the backup portion to provide a complete mirror of an entire content of the hard disk drive.

61. A single hard disk drive adapted to interface with a host computer, the hard disk drive comprising:
   a disk media that includes a primary portion and a logically separate backup portion; and
   a controller that (1) allows the host computer to read from and write to the primary portion, does not allow the host computer to write to the backup portion, and backs up the primary portion to the backup portion automatically, independently of an operating system of the host computer and without transferring the primary portion outside the hard disk drive during a first user-defined mode, and (2) allows the host computer to read from and write to the backup portion, does not allow the host computer to read from the primary portion, does not allow the host computer to write to the primary portion, and does not backup the primary portion to the backup portion during a second user-defined mode.

62. The hard disk drive according to claim 61, wherein the controller allows the host computer to read from the backup portion during the first user-defined mode.

63. The hard disk drive according to claim 61, wherein the controller does not allow the host computer to read from the backup portion during the first user-defined mode.

64. The hard disk drive according to claim 61, wherein the controller enters the first and second user-defined modes in response to a password sent from the host computer to the hard disk drive.

65. The hard disk drive according to claim 61, wherein the controller enters the first and second user-defined modes in response to a manually-actuatable mechanism that is part of the hard disk drive.

66. The hard disk drive according to claim 65, wherein the manually-actuatable mechanism is a switch.

67. The hard disk drive according to claim 65, wherein the manually-actuatable mechanism is a jumper.

68. The hard disk drive according to claim 61, wherein the controller backs up the primary portion to the backup portion under a user-defined criteria.

69. The hard disk drive according to claim 61, wherein the controller backs up the primary portion to the backup portion by adding an offset to logical block addresses in the primary portion.

70. The hard disk drive according to claim 61, wherein the controller backs up the primary portion to the backup portion to provide a complete mirror of an entire content of the hard disk drive.

71. A single hard disk drive adapted to interface with a host computer, the hard disk drive comprising:
   a housing for only the hard disc drive
   a disk media that includes a primary portion and a logically separate backup portion;
   a manually-actuatable mechanism with first and second settings; and
   a controller that (1) allows the host computer to read from and write to the primary portion, does not allow the host computer to write to the backup portion, and automatically backs up the primary portion to the backup portion without transferring the primary portion outside the hard disk drive when the manually-actuatable mechanism is in the first setting, and (2) allows the host computer to read from and write to the backup portion instead of the primary portion when the manually-actuatable mechanism is in the second setting.

72. The hard disk drive according to claim 71, wherein the controller allows the host computer to read from the backup portion when the manually-actuatable mechanism is in the first setting.

73. The hard disk drive according to claim 71, wherein the controller does not allow the host computer to read from the backup portion when the manually-actuatable mechanism is in the first setting.

74. The hard disk drive according to claim 71, wherein the controller backs up the primary portion to the backup portion in accordance with firmware in the hard disk drive.

75. The hard disk drive according to claim 71, wherein the controller backs up the primary portion to a first portion of the backup portion at a first time interval, and to a second portion of the backup portion at a second time interval that exceeds the first time interval.

76. The hard disk drive according to claim 71, wherein the manually-actuatable mechanism is a switch.

77. The hard disk drive according to claim 71, wherein the manually-actuatable mechanism is a jumper.

78. The hard disk drive according to claim 71, wherein the controller backs up the primary portion to the backup portion under a user-defined criteria.

79. The hard disk drive according to claim 71, wherein the controller backs up the primary portion to the backup portion by adding an offset to logical block addresses in the primary portion.

80. The hard disk drive according to claim 71, wherein the controller backs up the primary portion to the backup portion to provide a complete mirror of an entire content of the hard disk drive.

81. A single hard disk drive adapted to interface with a host computer, the hard disk drive comprising:
   a disk media that includes a primary portion and a logically separate backup portion;

a manually-actuatable mechanism with first and second settings; and a controller that (1) allows the host computer to read from and write to the primary portion, does not allow the host computer to write to the backup portion, backs up the primary portion to the backup portion without transferring the primary portion outside the housing, and does not backup the backup portion to the primary portion when the manually-actuatable mechanism is in the first setting, and (2) allows the host computer to read from and write to the backup portion, does not allow the host computer to read from the primary portion, does not allow the host computer to write to the primary portion, and does not backup the backup portion to the primary portion when the manually-actuatable mechanism is in the second setting.

82. The hard disk drive according to claim 81, wherein the controller allows the host computer to read from the backup portion when the manually-actuatable mechanism is in the first setting.

83. The hard disk drive according to claim 81, wherein the controller does not allow the host computer to read from the backup portion when the manually-actuatable mechanism is in the first setting.

84. The hard disk drive according to claim 81, wherein the controller backs up the primary portion to the backup portion in accordance with firmware in the hard disk drive.

85. The hard disk drive according to claim 81, wherein the controller backs up the primary portion to a first portion of the backup portion at a first time interval, and to a second portion of the backup portion at a second time interval that exceeds the first time interval.

86. The hard disk drive according to claim 81, wherein the manually-actuatable mechanism is a switch.

87. The hard disk drive according to claim 81, wherein the manually-actuatable mechanism is a jumper.

88. The hard disk drive according to claim 81, wherein the controller backs up the primary portion to the backup portion under a user-defined criteria.

89. The hard disk drive according to claim 81, wherein the controller backs up the primary portion to the backup portion by adding an offset to logical block addresses in the primary portion.

90. The hard disk drive according to claim 81, wherein the controller backs up the primary portion to the backup portion to provide a complete mirror of an entire content of the hard disk drive.

91. A single hard disk drive adapted to interface with a host computer, the hard disk drive comprising:

a housing for only the disc drive a disk media that includes a primary portion and a logically separate backup portion; and a controller that (1) allows the host computer to read from and write to the primary portion, does not allow the host computer to read from the backup portion, does not allow the host computer to write to the backup portion, backs up the primary portion to the backup portion automatically without transferring the primary portion outside the hard disk drive, and does not backup the backup portion to the primary portion during a first user-defined mode, and (2) allows the backup portion to be transferred to the host computer during a second user-defined mode.

92. The hard disk drive according to claim 91, wherein the controller allows the backup portion to be transferred to the host computer by transferring the backup portion to the primary portion and allowing the host computer to read the primary portion, and the controller does not allow the host computer to read the backup portion during the second user-defined mode.

93. The hard disk drive according to claim 91, wherein the controller allows the backup portion to be transferred to the host computer by allowing the host computer to read from the backup portion during the second user-defined mode.

94. The hard disk drive according to claim 91, wherein the controller enters the first and second user-defined modes in response to a password sent from the host computer to the hard disk drive.

95. The hard disk drive according to claim 91, wherein the controller enters the first and second user-defined modes in response to a manually-actuatable mechanism that is part of the hard disk drive.

96. The hard disk drive according to claim 95, wherein the manually-actuatable mechanism is a switch.

97. The hard disk drive according to claim 95, wherein the manually-actuatable mechanism is a jumper.

98. The hard disk drive according to claim 91, wherein the controller backs up the primary portion to the backup portion under a user-defined criteria.

99. The hard disk drive according to claim 91, wherein the controller backs up the primary portion to the backup portion by adding an offset to logical block addresses in the primary portion.

100. The hard disk drive according to claim 91, wherein the controller backs up the primary portion to the backup portion to provide a complete mirror of an entire content of the hard disk drive.

* * * * *